June 9, 1931.　　　　　C. S. THOMAS　　　　1,808,940
BRACE CHUCK
Filed March 7, 1928
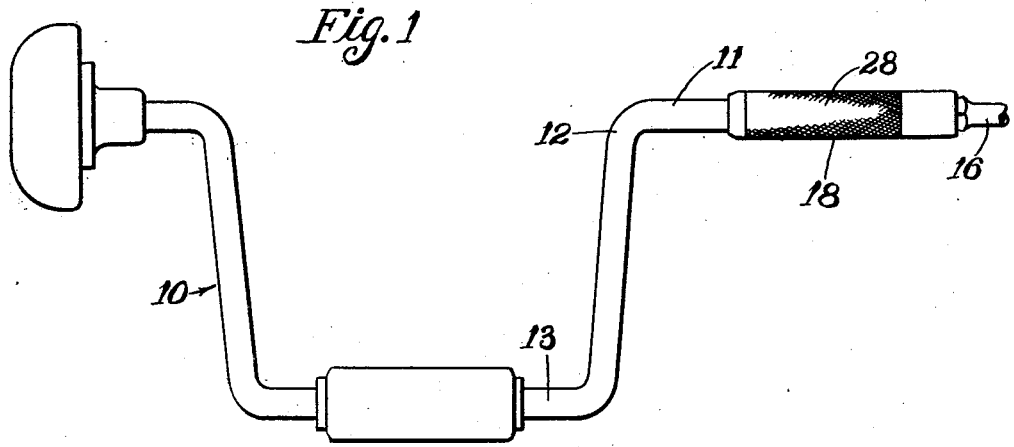
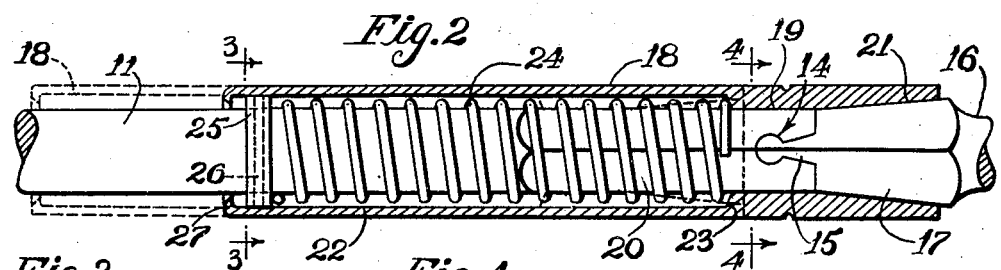
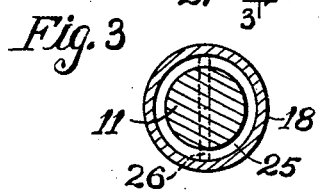 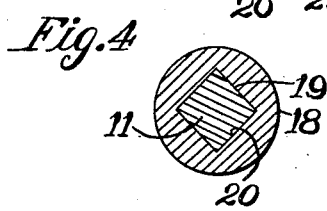
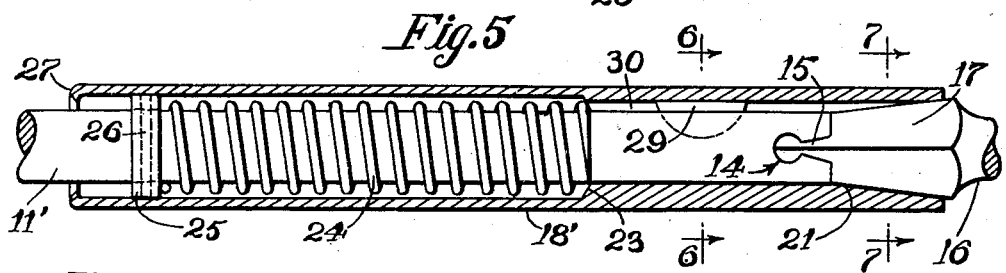
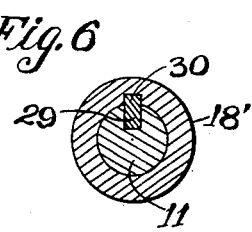 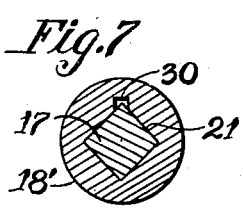
Inventor
Charles S. Thomas
By Wilson & McCanna
Atty's Patented June 9, 1931

1,808,940

UNITED STATES PATENT OFFICE

CHARLES S. THOMAS, OF SAN DIEGO, CALIFORNIA

BRACE CHUCK

Application filed March 7, 1928. Serial No. 259,772.

This invention relates to tool couplings generally but has more particular reference to brace chucks.

The principal object of my invention is to provide an extremely simple, serviceable and quick acting type of chuck which, despite the fact that the same can be produced at very low cost and hence may be provided on low priced braces, nevertheless is capable of holding a bit in an absolutely true and positive manner for accurate boring. In other words, while expense in construction is minimized precision is not sacrificed in the tool of the present invention.

The invention is illustrated in the accompanying drawings wherein—

Figure 1 is a view of an ordinary hand brace equipped with my improved chuck;

Fig. 2 is an enlarged central longitudinal section through the chuck;

Figs. 3 and 4 are cross-sections on the lines 3—3 and 4—4 of Fig. 2;

Fig. 5 is a section corresponding to Fig. 2 of a slightly modified or alternative construction; and Figs. 6 and 7 are cross-sections taken on the lines 6—6 and 7—7 of Fig. 5.

Similar reference numerals are applied to corresponding parts throughout the views.

The brace 10 has a cylindrical shank 11 which, in the case of a low priced tool such as is herein contemplated, may be formed by bending at 12 so as to form the shank in one piece of rod with the handle portion 13. The end of the shank 11 has a transverse keyhole-shaped slot 14 cut therein to receive the complementarily formed nib end 15 of a bit 16. The latter has the usual tapered squared end 17 terminating in the nib 15 just referred to. A sleeve 18 has a square bore 19 slidably received on the squared end 20 of the shank 11. The bore 19 is flared, as indicated at 21, to provide a tapered square socket for the snug reception of the tapered squared end 17 of the bit 16. The sleeve 18 by reason of the cooperation of its square bore 19 with the squared end 20 of the shank 11 is non-rotatable on the shank and hence serves to transmit the drive from the shank to the bit. The sleeve 18 has an enlarged cylindrical bore 22 behind the square bore 19, thus affording an annular shoulder at 23 serving as an abutment for one end of a coiled compression spring 24 received within the sleeve 18 on the shank 11. The other end of the spring 24 engages a ring 25 suitably swedged on the shank 11 and pinned thereto, as indicated at 26. The spring 24, therefore, acts between the shank 11 and the sleeve 18 normally to urge the sleeve outwardly and, when there is no bit in the brace, outward movement of the sleeve is limited by the inwardly swedged end 27 of the sleeve 18 which is arranged to come into engagement with the ring 25. The latter has a working fit in the bore 22 of the sleeve so as to provide a bearing for the sleeve and permit the sliding back and forth thereof with comparative ease depending on the heft of the spring 24. The sleeve is knurled, as indicated at 28, to facilitate the movement thereof by hand.

In operation, it will be observed that when the sleeve 18 is retracted against the action of the spring 24 until the slotted end of the shank protrudes from the end of the sleeve, as is evident from the dotted line showing of the sleeve in Fig. 2, the nib end of the bit 16 may be entered in the slot 14 by transverse movement of the bit with respect to the shank. Then, when the sleeve 18 is allowed to return either entirely under the action of the spring 24 or aided by hand, the nib end of the bit is at once confined in the slot and the sleeve causes the bit to be centered with respect to the shank due to the cooperation of the tapered squared end 17 of the bit in the tapered socket 21. The sleeve, furthermore, tends to become wedged on the tapered end of the bit so that the latter is made absolutely rigid with the shank. The ease and facility with which a bit may be inserted or removed is no doubt evident since there is nothing to be threaded or unthreaded and nothing to be locked or unlocked. Nevertheless, it has been found that there is not the slightest danger of a bit working loose in a chuck of the present type and despite the fact that the brace may be produced at extremely low cost experience has shown that practically the same degree of precision is obtained as in higher priced tools. In passing, attention may be called to the fact that the sleeve 18 in the bit holding position thereof is held absolutely true with respect to the shank by reason of the fact that it has a bearing at one end on the ring 25 and at the other end on the end of the shank, thereby insuring the absolutely true mounting of the bit.

The modified or alternative construction illustrated in Figs. 5-7 departs from the one just described only to the extent that a key 29 on the outer end of the shank 11' is slidably received in a keyway 30 provided in the sleeve 18', it being thought that a slight saving in cost over the squaring of the end of the shank may be realized by such a change in construction. The drive is, of course, transmitted from the shank through the key to the sleeve 18' and thence to the bit by the cooperation of the square tapered socket 21 with the squared tapered end 17 of the bit. The operation of this form of the invention is otherwise the same as the other.

While the two chucks have been described as applied to braces it will be evident that they might be employed on bit extensions to equal advantage. That is particularly so of the chuck illustrated in Fig. 5 where the overall length is somewhat greater than that of the chuck shown in Fig. 2, it being well recognized that it is particularly desirable in brace chucks to keep the over-all length to a minimum whereas in the case of bit extensions that is not so important.

It is believed the foregoing description conveys a clear understanding of my invention and of all its objects and advantages. While I have chosen to illustrate the invention in two forms it will be evident that still other forms may be devised without departing from the spirit of the invention. For that reason all legitimate modifications and adaptations are intended to be covered in the appended claims.

I claim:

1. In a chuck of the character described, the combination of a driving shank having means at the outer end thereof for interlocking engagement with the end of a bit permitting coupling and uncoupling only by transverse movement of the bit with respect to the shank, a single sleeve slidable on the shank having means in the telescoping joint therebetween for holding the sleeve against turning relative to the shank, said sleeve having a tapered polygonal-shaped socket in the outer end thereof to receive the complementarily formed tapered end of the bit whereby to center the same and make wedging engagement therewith and transmit drive thereto, an annular shoulder on the shank having the inner end of the sleeve arranged to telescope thereon, spring means within said sleeve acting between the shoulder and the sleeve normally urging the sleeve outwardly toward bit holding position, and means serving to limit the outward movement of the sleeve.

2. A chuck as set forth in claim 1 wherein the annular shoulder is provided by a ring projection on said shank the said ring having a working fit in the bore of the sleeve so as to serve as a bearing for the inner end thereof and maintain the sleeve in concentric relation with the shank, and wherein the inner end of the sleeve is provided with an inwardly projecting flange to come into engagement with the back of the ring so as to limit the outward movement of the sleeve.

3. In a chuck, the combination of a driving shank having means at the outer end thereof for chucking a bit, a single sleeve slidable on the shank but having means in the telescoping joint therebetween, at the outer end of the sleeve, for holding the sleeve against turning on the shank, said means permitting enough endwise movement of the sleeve on the shank for attachment or removal of a bit, said sleeve having a tapered polygonal-shaped socket in the outer end thereof to receive the complementarily formed end of the bit whereby to center the bit and make wedging engagement therewith and also transmit drive thereto, the inner end of the sleeve having the bore thereof enlarged, a ring projection on the shank telescoping in said enlarged bore, and spring means within said sleeve acting between said ring and an internal annular shoulder provided on the sleeve at the end of the enlarged bore normally to urge the sleeve outwardly toward bit holding position.

4. A device of the character described, comprising a driving shank, a tool, the said members having complementary interfitting end portions to form a joint therebetween to lock the tool to the shank to turn therewith, a single sleeve slidable on the shank and keyed thereon against rotation with respect thereto arranged to fit over the joint between and engage both the shank and tool, there being a shoulder on the sleeve and another shoulder on the shank behind the same, and a coiled compression spring on the shank engaging the shoulders at opposite ends thereof tending to hold the sleeve in tool-holding position.

5. A device of the character described, comprising a driving shank, a tool, the said members having complementary interfitting end portions to form a joint therebetween to lock the tool to the shank to turn therewith, a single sleeve telescoping on the shank, there being means between the telescoping parts which serves to hold the sleeve against rotation with respect to the shank, and there being a shoulder on the sleeve and another shoulder on the shank behind the same, and a coiled compression spring on the shank engaging the shoulders at opposite ends thereof tending to hold the sleeve in tool-holding position.

6. A device of the character described, comprising a cylindrical driving shank, a tool, a dovetail joint between the tool and shank locked only against torsional and endwise movement of the tool in relation to the shank, a cylindrical elongated sleeve having a cylindrical bore for slidably mounting the sleeve on the end of the shank to permit sliding the same over the joint to engage both the shank and tool to prevent all movement of the tool in relation to the shank, there being a keyway provided in said sleeve and a key mounted on the end of the shank slidably received therein to hold the sleeve against turning relative to the shank to transmit drive from the shank to the tool, said sleeve having the rearward portion of the bore thereof enlarged, a fixed ring projection on the shank fitting in the enlarged portion of the bore of said sleeve, and a coiled compression spring within said sleeve engaging the ring at one end and engaging at its other end the annular shoulder provided at the end of the enlarged portion of the bore in the sleeve.

In witness of the foregoing I affix my signature.

CHARLES S. THOMAS.